United States Patent
Basnayake

(10) Patent No.: US 8,195,357 B2
(45) Date of Patent: Jun. 5, 2012

(54) IN-VEHICLE SENSOR-BASED CALIBRATION ALGORITHM FOR YAW RATE SENSOR CALIBRATION

(75) Inventor: Chaminda Basnayake, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 1085 days.

(21) Appl. No.: 12/104,022

(22) Filed: Apr. 16, 2008

(65) Prior Publication Data
US 2009/0265054 A1    Oct. 22, 2009

(51) Int. Cl.
*G01M 17/06* (2006.01)
*G06F 7/00* (2006.01)

(52) U.S. Cl. .................................. 701/33.1; 701/468
(58) Field of Classification Search ............... 701/1, 29, 701/214, 216, 217; 702/104
See application file for complete search history.

(56) References Cited

U.S. PATENT DOCUMENTS

| | | | | |
|---|---|---|---|---|
| 4,470,124 A * | 9/1984 | Tagami et al. | ................... | 702/87 |
| 5,274,576 A * | 12/1993 | Williams | ............................... | 1/1 |
| 5,285,390 A * | 2/1994 | Haseda et al. | ................... | 701/41 |
| 5,627,756 A * | 5/1997 | Fukada et al. | ................... | 701/70 |
| 5,642,281 A * | 6/1997 | Ishida et al. | ..................... | 701/41 |
| 5,719,790 A * | 2/1998 | Lohrenz et al. | ................ | 702/104 |
| 5,809,434 A * | 9/1998 | Ashrafi et al. | .................... | 701/1 |
| 5,826,204 A * | 10/1998 | Ulm | ................................. | 701/1 |
| 5,842,143 A * | 11/1998 | Lohrenz et al. | ................ | 701/34 |
| 5,857,160 A * | 1/1999 | Dickinson et al. | .............. | 701/41 |
| 5,878,357 A * | 3/1999 | Sivashankar et al. | ............. | 701/1 |
| 5,964,819 A * | 10/1999 | Naito | ................................. | 701/72 |
| 6,101,434 A | 8/2000 | Irie et al. | | |
| 6,112,147 A * | 8/2000 | Ghoneim et al. | ................ | 701/80 |
| 6,314,329 B1 * | 11/2001 | Madau et al. | .................... | 700/89 |
| 6,324,445 B2 * | 11/2001 | Tozu et al. | ........................ | 701/1 |
| 6,363,309 B1 * | 3/2002 | Irie et al. | ........................ | 701/70 |
| 6,366,833 B1 * | 4/2002 | Fukuyama | ......................... | 701/1 |
| 6,374,162 B1 * | 4/2002 | Tanaka et al. | ..................... | 701/1 |
| 6,498,971 B2 | 12/2002 | Leaphart | | |
| 6,564,125 B2 * | 5/2003 | Pattok et al. | .................... | 701/29 |
| 6,704,631 B2 * | 3/2004 | Winner et al. | ................... | 701/34 |
| 6,763,293 B2 | 7/2004 | Dilger | | |
| 7,085,642 B2 * | 8/2006 | Samuel et al. | ................... | 701/82 |
| 7,353,096 B2 * | 4/2008 | Hayashi | .......................... | 701/34 |
| 7,684,945 B2 * | 3/2010 | Walter et al. | .................... | 702/96 |

(Continued)

OTHER PUBLICATIONS

Basnayake, C., Mezentsev, O., Lachapelle, G., Cannon, M. E., "A Portable Vehicular Navigation System Using High Sensitivity GPS Augmented with Inertial Sensors and Map-matching", SAE International, 2003.

*Primary Examiner* — Darnell Jayne
*Assistant Examiner* — Joshua Rodden
(74) *Attorney, Agent, or Firm* — John A. Miller; Miller IP Group, PLC

(57) ABSTRACT

A system and method for calibrating a vehicle heading sensor, such as a yaw-rate sensor, when GPS signals are not available using a bias update model that employs a bias gain factor. In order for the bias update model to be accurate, the vehicle should be traveling relatively straight. One embodiment of the present invention uses three thresholds to determine if the vehicle is traveling straight. These thresholds include a yaw-rate threshold, a steering wheel angle threshold and a wheel speed threshold. If all three of the thresholds indicate that the vehicle is traveling straight, then the update bias model can be used to calibrate the yaw-rate sensor.

18 Claims, 1 Drawing Sheet

U.S. PATENT DOCUMENTS

| | | | |
|---|---|---|---|
| 7,920,981 B2 * | 4/2011 | Fennel et al. | 702/94 |
| 7,957,897 B2 * | 6/2011 | Basnayake | 701/214 |
| 2003/0040856 A1 * | 2/2003 | Winner et al. | 701/34 |
| 2004/0154375 A1 * | 8/2004 | Mattes et al. | 73/1.08 |
| 2005/0049787 A1 * | 3/2005 | Cho | 701/216 |
| 2009/0005985 A1 * | 1/2009 | Basnayake | 701/214 |
| 2009/0088974 A1 * | 4/2009 | Yasan et al. | 701/213 |
| 2010/0114433 A1 * | 5/2010 | Lewis | 701/41 |
| 2010/0168957 A1 * | 7/2010 | Takahashi | 701/34 |

* cited by examiner

IN-VEHICLE SENSOR-BASED CALIBRATION ALGORITHM FOR YAW RATE SENSOR CALIBRATION

BACKGROUND OF THE INVENTION

1. Field of the Invention

This invention relates generally to a system and method for calibrating a heading sensor, such as a yaw-rate sensor, and, more particularly, to a system and method for removing sensor bias errors from a yaw-rate sensor to use the yaw-rate sensor to provide an accurate vehicle heading when GPS signals are not available, where the system and method employ a bias update model to calibrate the sensor using the yaw-rate, a steering wheel angle and a differential wheel speed to identify time windows where the vehicle is traveling relatively straight.

2. Discussion of the Related Art

GPS signals, or other Global Navigation Satellite System (GNSS) signals, can provide accurate positioning and navigation. However, GPS receivers suffer from sky visibility-related limitations, for example, in urban canyons and areas with dense tree cover. Further, GPS signals may suffer from multi-path errors or cross-correlation errors in such areas. Because of existing highly sensitive and fast reacquisition GPS technology, accurate GPS signals become available when sky visibility is temporarily improved for short durations, such as 10-20 seconds, even in less than optimum environments. Therefore, the continuity of GPS technology comes down to maintaining positioning accuracy through GPS outages between GPS available time windows.

Automotive-grade inertial sensors, such as yaw-rate sensors and accelerometers, have highly variable bias and scale characteristics that cause sensor drift that typically makes them un-suitable for navigation and heading determination functions without proper error correction techniques. For example, certain automotive-grade yaw-rate sensors allow up to 2 deg/sec variations for the yaw-rate sensor bias. If such a variability is not corrected, and is allowed for over a period of two minutes, a yaw-rate sensor starting with a bias of 0 deg/sec at zero seconds could reach a bias of 2 deg/sec after 120 seconds. If a linear growth of bias were assumed for simplicity, a heading change derived by integrating yaw-rate sensor signals that is not calibrated would indicate a heading change of 120° only as a result of the variation of the bias.

Inertial sensors can be used in combination with GPS receivers to provide a reasonably accurate vehicle heading, and position if a distance measure, such as vehicle wheel speeds, are available, even when the GPS signals are not available. However, automotive-grade inertial sensors do not typically provide the same level of accuracy as GPS signals. GPS/inertial sensor integrated systems can calibrate the inertial sensors and maintain vehicle heading and position accuracy using GPS signals when the GPS signals are available, and use the calibrated inertial sensors when the GPS signals are not available to maintain a heading and a position solution until the GPS signals become available again.

Known yaw-rate sensor calibration algorithms typically approach bias and scale calibration as a two-step process, and require specific vehicle maneuvers to be performed for the calibration. For example, sensor bias calibration may require the vehicle to be driven in a straight line or be stationary for a known period of time so that the accumulated heading error can be directly estimated as a result of sensor bias error. For scale calibration, the vehicle may be required to be driven through a controlled turn.

U.S. patent application Ser. No. 11/770,898, title GPS-Based In-Vehicle Sensor Calibration Algorithm, filed Jun. 29, 2007, assigned to the assignee of this application and herein incorporated by reference, discloses a system and method for calibrating a heading sensor using GPS signals. The system receives wheel speed or rotation signals, a vehicle odometer reading, GPS signals and yaw-rate signals, and uses the GPS signals to calibrate the heading sensor while the GPS signals are available.

As discussed above, the '898 application calibrates the heading sensor using GPS signals when they are available, so that when the GPS signals are not available the heading sensor will be fairly accurate for some period of time. However, if the GPS signals are unavailable for an extended period of time, then it may be desirable to calibrate the heading sensor when the GPS signals are not available to maintain the accuracy of the heading sensor.

SUMMARY OF THE INVENTION

In accordance with the teachings of the present invention, a system and method are disclosed for calibrating a vehicle heading sensor, such as a yaw-rate sensor, when GPS signals are not available using a bias update model that employs a bias gain factor. In order for the bias update model to be accurate, the vehicle should be traveling relatively straight. One embodiment of the present invention uses three thresholds to determine if the vehicle is traveling straight. These thresholds include a yaw-rate threshold, a steering wheel angle threshold and a wheel speed threshold. If all three of these thresholds indicate that the vehicle is traveling straight, then the update bias model can be used to calibrate the yaw-rate sensor.

Additional features of the present invention will become apparent from the following description and appended claims taken in conjunction with the accompanying drawings.

DETAILED DESCRIPTION OF THE EMBODIMENTS

The following discussion of the embodiments of the invention directed to a system and method for calibrating a yaw-rate sensor when GPS signals are not available using a bias update model is merely exemplary in nature, and is in no way intended to limit the invention or its applications or uses.

Figure 1:
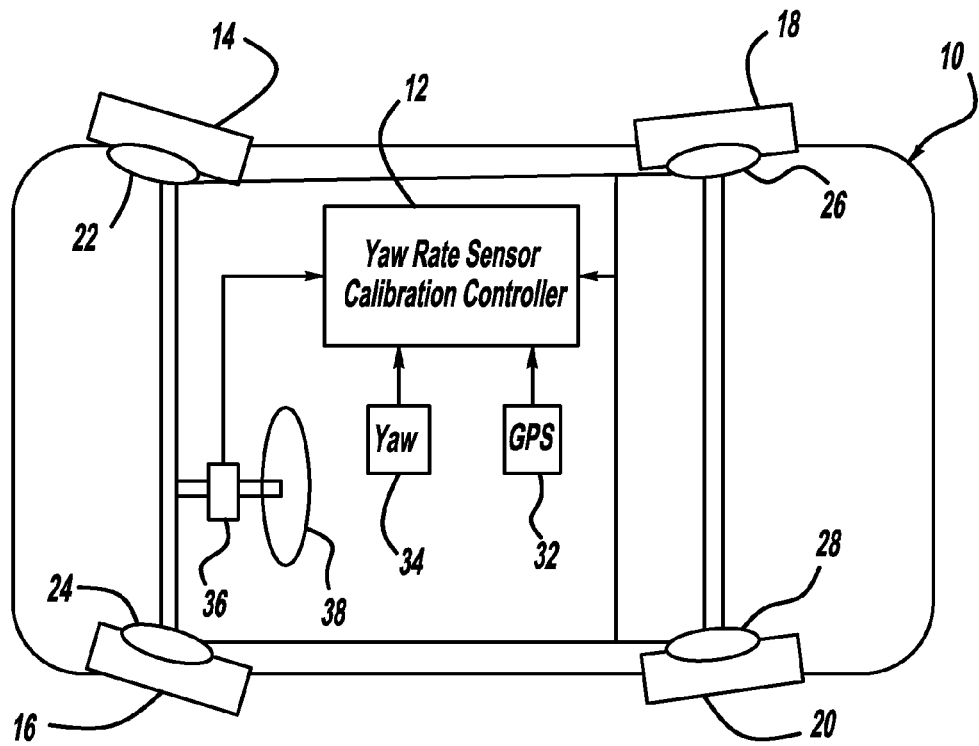
FIG. 1 is a plan view of a vehicle including a system for providing yaw-rate sensor calibration, according to an embodiment of the present invention.

FIG. 1 is a plan view of a vehicle 10 including a yaw-rate sensor calibration controller 12, according to an embodiment of the present invention. The vehicle 10 also includes front wheels 14 and 16 and rear wheels 18 and 20. The wheels 14, 16, 18 and 20 each include a wheel speed sensor 22, 24, 26 and 28, respectively, that provide wheel speed and/or wheel rotation signals to the controller 12. A GPS receiver 32 provides GPS signals to the controller 12, and a yaw-rate sensor 34 provides vehicle yaw rate sensor signals to the controller 12. Also, a hand-wheel angle sensor 36 provides a steering wheel angle signal of the rotation of a steering wheel 38 to the controller 12.

The present invention proposes using a constant heading update (CHUPT) algorithm that employs a bias update model in the controller 12 for calibrating the yaw-rate sensor 34 when the GPS signals are not available. Although, the bias update model calibrates the yaw-rate sensor 34, in other embodiments, any suitable heading or inertial sensor that provides vehicle heading can be calibrated by the CHUPT algorithm. The CHUPT algorithm calculates a yaw bias signal YawBias$_i$ that is used to reduce the bias error of the yaw-rate sensor 34 so that it provides an accurate heading reading.

In this embodiment, the bias update model is defined as:

$$\text{YawBias}_i = (1-\beta_{CHUPT})\text{YawBias}_{i-1} + \beta_{CHUPT}\text{YawRate}_{i,CHUPT} \quad (1)$$

Where $\beta_{CHUPT}$ is a bias gain factor.

In order for the bias update model to be accurate, the vehicle 10 needs to be traveling relatively straight. The CHUPT algorithm uses vehicle yaw-rate, steering wheel angle and differential wheel speeds to identify time windows where a vehicle heading is relatively constant, i.e., the vehicle is traveling straight. The extent of how straight the vehicle travel needs to be and how long the time window can be are controlled by four predetermined parameters, namely, a yaw standard deviation threshold $\nabla_{YawSTD}$, a steering wheel angle standard deviation threshold $\nabla_{SteerAngSTD}$, a differential wheel speed threshold $\nabla_{dWheelSpeed}$ and time window lengths.

Equations (2) and (3) below identify how the algorithm determines if the standard deviation of the yaw-rate signal YawRate is less than the yaw standard deviation threshold $\nabla_{YawSTD}$ and if the standard deviation of the steering wheel angle signal SteeringWheelAng during the time window P is less than the steering wheel angle standard deviation threshold $\nabla_{SteerAngSTD}$, respectively.

$$std(\text{YawRate}_{i-N:i}) < \nabla_{YawSTD} \quad (2)$$

Where N is a yaw-rate window length.

$$std(\text{SteeringWheelAng}_{i-P:i}) < \nabla_{SteerAngSTD} \quad (3)$$

Where P is a steering wheel angle window.

The conditions of equations (2) and (3) can still be fulfilled in scenarios where the vehicle 10 is traveling along a curve and the steering wheel angle is kept constant. The yaw-rate signal may also indicate a constant vehicle heading under these circumstances. In such a scenario, the yaw-rate signal indicates an actual heading rate that should not be considered as a change in the bias. In order to avoid such misidentifications, a differential wheel speed verification can be performed. This verification, shown by equation (4) below, verifies that the difference between the left and right non-driven wheel counts or speeds are only indicating the measurement noise and no significant differences are observed during a given time window.

$$|\text{WheelSpeed}_L - \text{WheelSpeed}_R| < \nabla_{dWheelSpeed} \quad (4)$$

Where WheelSpeed$_L$ is the wheel speed of a left non-driven wheel and WheelSpeed$_R$ is the wheel speed of a right non-driven wheel.

If the steering wheel angle standard deviation and yaw-rate standard deviation do not change beyond a predetermined thresholds and the relative speed between the non-driven wheels also is about the same within a predetermined threshold, then it is assumed that the vehicle 10 is not turning. The CHUPT algorithm updates the current yaw-rate bias YawBias$_i$ using the yaw-rate signal and equation (1) when the conditions given in equations (2)-(4) are met.

Figure 2:
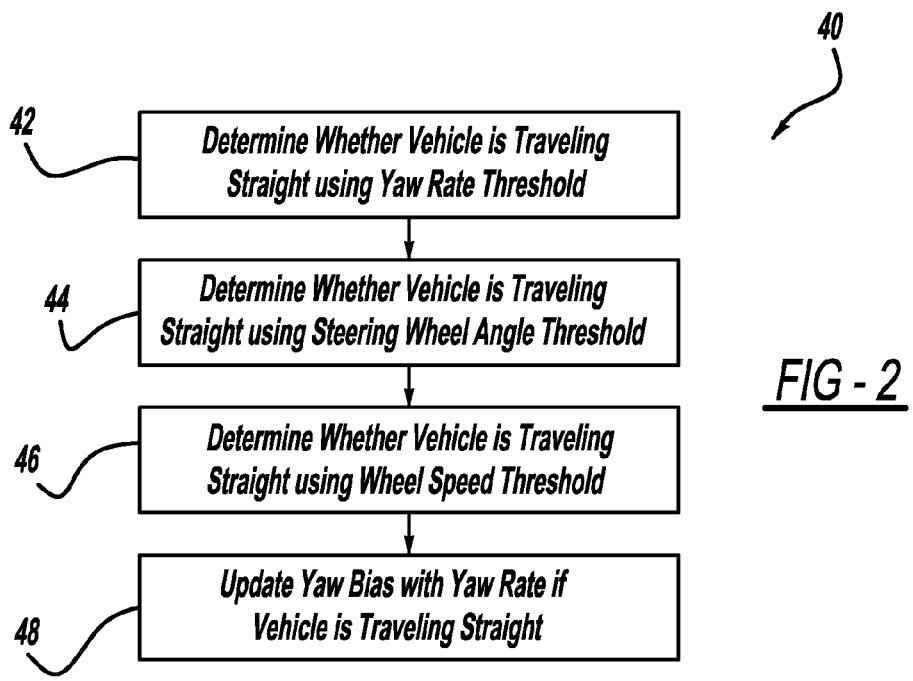
FIG. 2 is a flow chart diagram showing a process for calibrating a yaw-rate sensor using a bias update model, according to an embodiment of the present invention.

FIG. 2 is a flow chart diagram 40 showing the steps of the present invention for correcting the yaw bias of the yaw-rate sensor 34, according to an embodiment of the present invention. At box 42, the algorithm determines whether the vehicle 10 is traveling straight using the yaw-rate threshold calculation of equation (2). At box 44, the algorithm determines whether the vehicle 10 is traveling straight using the steering wheel angle threshold calculation of equation (3). At box 46, the algorithm determines whether the vehicle 10 is traveling straight using the wheel speed threshold calculation of equation (4). If all of these calculations determine that the vehicle 10 is traveling relatively straight, then the algorithm updates or calibrates the yaw-rate sensor 34 using the update bias model of equation (1).

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A yaw-rate sensor calibration system in a vehicle, said vehicle including four wheels, said system comprising:
   a yaw-rate sensor providing a yaw-rate signal indicating a yaw of the vehicle;
   a hand-wheel angle sensor providing a rotation signal of the rotation of a steering wheel of the vehicle;
   a plurality of wheel speed sensors for providing wheel speed signals of the speed of the wheels of the vehicle; and
   a yaw-rate sensor calibration controller for calibrating the yaw-rate sensor using a bias update model, said controller being responsive to the yaw-rate signal, the rotation signal and the wheel speed signals, said calibration controller determining whether the vehicle is traveling relatively straight using separate calculations for each of the yaw-rate signal, the hand-wheel angle signal and the wheel speed signals, and wherein said calibration controller determines that the vehicle is traveling relatively straight when all of said separate calculations each provide an indication that the vehicle is traveling relatively straight, and said controller calibrating the yaw-rate sensor if the vehicle is traveling relatively straight.

2. The system according to claim 1 further comprising a GPS receiver providing GPS signals to the calibration controller indicating the position of the vehicle, said calibration controller using the GPS signals to calibrate the yaw-rate sensor when the GPS signals are available and using the bias update model to calibrate the yaw-rate sensor when the GPS signals are not available.

3. The system according to claim 1 wherein the calibration controller calibrates the yaw-rate sensor using the bias update model by calculating a yaw bias using the following equation:

$$\text{YawBias}_i = (1-\beta_{CHUPT})\text{YawBias}_{i-1} + \beta_{CHUPT}\text{YawRate}_{i,CHUPT}$$

where YawBias$_i$ is the yaw bias at time i, YawBias$_{i-1}$ is the yaw bias at time i−1, YawRate$_{i,CHUPT}$ is the yaw rate at time i and $\beta_{CHUPT}$ is a bias gain factor.

4. The system according to claim 1 wherein the calibration controller determines whether the vehicle is traveling relatively straight using a standard deviation of the yaw-rate signal and the equation:

$$std(\text{YawRate}_{i-N:i}) < \nabla_{YawSTD}$$

where N is a yaw-rate window length, YawRate is the yaw-rate signal and $\nabla_{YawSTD}$ is a yaw-rate standard deviation threshold.

5. The system according to claim 1 wherein the calibration controller determines whether the vehicle is traveling straight using the rotation signal and the equation:

$$std(SteeringWheelAng_{i-P:i}) < \nabla_{SteerAngSTD}$$

where P is a steering wheel angle window length, SteeringWheelAngle is the rotation signal, and $\nabla_{SteerAngSTD}$ is a steering wheel angle standard deviation threshold.

6. The system according to claim 1 wherein the calibration controller determines whether the vehicle is traveling straight using the wheel speed signals and the equation:

$$|WheelSpeed_L - WheelSpeed_R| < \nabla_{dWheelSpeed}$$

where $\nabla_{dWheelSpeed}$ is a differential wheel speed threshold, $WheelSpeed_L$ is the speed of a non-driven left wheel speed and $WheelSpeed_R$ is the speed of a non-driven right wheel speed.

7. A heading sensor calibration system in a vehicle, said vehicle including four wheels, said system comprising:
a heading sensor providing a heading signal indicating a heading of the vehicle;
a plurality of vehicle sensors providing sensor signals identifying parameters of the vehicle; and
a heading sensor calibration controller for calibrating the heading sensor using a bias update model, said controller being responsive to the heading signal and the sensor signals, said controller using the heading signal and the sensor signals to determine whether the vehicle is traveling relatively straight, wherein the plurality of vehicle sensors include a hand-wheel angle sensor providing a rotation signal of the rotation of a steering wheel of the vehicle and a plurality of wheel speed sensors for providing wheel speed signals of the speed of the wheels of the vehicle, said controller using the rotation signal, the heading signal and the wheel speed signals to determine whether the vehicle is traveling relatively straight, and wherein said controller determines that the vehicle is traveling relatively straight when separate calculations for each of the heading signal, the rotation signal and the wheel speed signals each provide an indication that the vehicle is traveling relatively straight, and said controller calibrating the heading sensor if the vehicle is traveling relatively straight.

8. The system according to claim 7 wherein the heading sensor is a yaw-rate sensor providing a yaw-rate signal indicating a yaw of the vehicle.

9. The system according to claim 8 wherein the calibration controller calibrates the yaw-rate sensor using the bias update model by calculating a yaw bias using the following equation:

$$YawBias_i = (1 - \beta_{CHUPT})YawBias_{i-1} + \beta_{CHUPT}YawRate_{i,CHUPT}$$

where $YawBias_i$ at time i, $YawBias_{i-1}$ is the yaw bias at time i-1, $YawRate_{i,CHUPT}$ is yaw rate at time i is the yaw bias and $\beta_{CHUPT}$ is a bias gain factor.

10. The system according to claim 7 wherein the calibration controller determines whether the vehicle is traveling relatively straight using the heading signal and the equation:

$$std(YawRate_{i-N:i}) < \nabla_{YawSTD}$$

where N is a window length, YawRate is a yaw-rate signal and $\nabla_{YawSTD}$ is a yaw-rate standard deviation threshold.

11. The system according to claim 7 wherein the calibration controller determines whether the vehicle is traveling straight using the rotation signal and the equation:

$$std(SteeringWheelAng_{i-P:i}) < \nabla_{SteerAngSTD}$$

where P is a steering wheel angle window length, SteeringWheelAngle is the rotation signal, and $\nabla_{SteerAngSTD}$ is a steering wheel angle standard deviation threshold.

12. The system according to claim 7 wherein the calibration controller determines whether the vehicle is traveling straight using the wheel speed signals and the equation:

$$|WheelSpeed_L - WheelSpeed_R| < \nabla_{dWheelSpeed}$$

where $\nabla_{dWheelSpeed}$ is a differential wheel speed threshold, $WheelSpeed_L$ is the speed of a non-driven left wheel speed and $WheelSpeed_R$ is the speed of a non-driven right wheel speed.

13. The system according to claim 7 further comprising a GPS receiver providing GPS signals to the calibration controller indicating the position of the vehicle, said calibration controller using the GPS signals to calibrate the heading sensor when the GPS signals are available and using the bias update model to calibrate the heading sensor when the GPS signals are not available.

14. A yaw-rate sensor calibration system in a vehicle, said vehicle including four wheels, said system comprising:
a yaw-rate sensor providing a yaw-rate single indicating a yaw of the vehicle;
a hand-wheel angle sensor providing a rotation signal of the rotation of a steering of the vehicle;
a plurality of wheel speed sensors for providing wheel speed signals of the speed of the wheels of the vehicle;
a GPS receiver providing GPS signals indicating the position of the vehicle; and
a yaw-rate sensor calibration controller for calibrating the yaw-rate sensor using a bias update model, said controller being responsive to the yaw-rate signal, the hand-wheel rotation signal, the wheel speed signals and the GPS signals, said calibration controller using the GPS signals to calibrate the yaw-rate sensor when the GPS signals are available and using the bias update model to calibrate the yaw-rate sensor when the GPS signals are not available and the vehicle is traveling relatively straight, said calibration controller determining whether the vehicle is traveling relatively straight using separate calculations for each of the yaw-rate signal, the hand-wheel angle signal and the wheel speed signals, and wherein said calibration controller determines that the vehicle is traveling relatively straight when all of said separate calculations each provide an indication that the vehicle is traveling relatively straight.

15. The system according to claim 14 wherein the calibration controller calibrates the yaw-rate sensor using the bias update model by calculating a yaw bias using the following equation:

$$YawBias_i = (1 - \beta_{CHUPT})YawBias_{i-1} + \beta_{CHUPT}YawRate_{i,CHUPT}$$

where $YawBias_i$ at time i, $YawBias_{i-1}$ is the yaw bias at time i-1, $YawRate_{i,CHUPT}$ is the yaw rate at time i is the yaw bias and $\beta_{CHUPT}$ is a bias gain factor.

16. The system according to claim 14 wherein the calibration controller determines whether the vehicle is traveling relatively straight using the yaw-rate signal and the equation:

$$std(YawRate_{i-N:i}) < \nabla_{YawSTD}$$

where N is a yaw-rate window length, YawRate is the yaw-rate signal and $\nabla_{YawSTD}$ is a yaw-rate standard deviation threshold.

17. The system according to claim 14 wherein the calibration controller determines whether the vehicle is traveling straight using the rotation signal and the equation:

$$std(SteeringWheelAng_{i-P:i}) < \nabla_{SteerAngSTD}$$

where P is a steering wheel angle window length, SteeringWheelAngle is the rotation signal, and $\nabla_{SteerAngSTD}$ is a steering wheel angle standard deviation threshold.

18. The system according to claim 14 wherein the calibration controller determines whether the vehicle is traveling straight using the wheel speed signals and the equation:

$$|WheelSpeed_L - WheelSpeed_R| \nabla_{dWheelSpeed}$$

where $\nabla_{dWheelSpeed}$ is a differential wheel speed threshold, $WheelSpeed_L$ is the speed of a non-driven left wheel speed and $WheelSpeed_R$ is the speed of a non-driven right wheel speed.

* * * * *